United States Patent [19]

Burgess

[11] Patent Number: 5,808,889
[45] Date of Patent: Sep. 15, 1998

[54] SYSTEM AND METHOD FOR IDENTIFYING AND CORRECTING COMPUTER OPERATIONS INVOLVING TWO DIGIT YEAR DATES

[75] Inventor: Allen G. Burgess, West Newton, Mass.

[73] Assignee: Data Integrity, Incorporated, West Newton, Mass.

[21] Appl. No.: 668,513

[22] Filed: Jun. 28, 1996

[51] Int. Cl.$^6$ ........................................... G06F 9/40
[52] U.S. Cl. ..................... 364/737; 395/562; 395/564; 395/963; 395/607
[58] Field of Search ................ 364/737; 395/607, 395/562, 564, 963

[56] References Cited

U.S. PATENT DOCUMENTS

| | | | |
|---|---|---|---|
| 5,600,836 | 2/1997 | Alter et al. | 395/612 |
| 5,649,188 | 7/1997 | Nomura et al. | 395/607 |
| 5,664,175 | 9/1997 | Jackson et al. | 395/607 |

OTHER PUBLICATIONS http://www.tsrconsulting.com/Catch21.htm; printed Mar. 9, 1998; pp. 1–5; author—TSR, Inc.
http://www.tocs.com/a2.htm; printed Mar. 9, 1998; pp. 1–2; author—Turn of the Century Solutions, Inc.

*Primary Examiner*—David H. Malzahn
*Attorney, Agent, or Firm*—Schnader Harrison Segal & Lewis LLP

[57] ABSTRACT

A system and method for identifying and correcting computer operations involving two digit year dates. The system includes: a computer and a routine for searching for a subtraction, comparison and sort operations on the computer involving a plurality of two digit quantities representing year dates. The subtraction operation is executed to obtain a difference value between the two quantities. A negative difference value is verified and a plurality of two digit numbers whose sum is 100 is added to the negative difference value so that the subtraction operation yields a correct result for two digit quantities representing years greater than or equal to the year 2000. A similar routine is added to existing computer code involving compare and/or sort operations.

42 Claims, 11 Drawing Sheets

SUBTRACTION

COMPARISON/SORT

SUBTRACTION CORRECTION

SYSTEM AND METHOD FOR IDENTIFYING AND CORRECTING COMPUTER OPERATIONS INVOLVING TWO DIGIT YEAR DATES

FIELD OF INVENTION

A system for identifying and correcting erroneous computer operations resulting from the use of two digits to represent year dates thereby addressing the "millennium" or "year 2000" problem.

BACKGROUND OF INVENTION

In the early days of computer programming, two digit year dates were used for the year in order to conserve database memory space. For example, Apr. 4, 1962 is typically stored as 620404, not 19620404. This format is still often used today. A problem alternately called "the millennium problem", "the year 2000 problem", "the year 2000 challenge" and/or "the year 2000 phenomena", exists with these two-digit year date fields in that on or after Jan. 1, 2000, computer operations involving subtraction, sorting, and comparisons will yield incorrect results. For example, a computer operation that requires the subtraction of the year 1998 from the year 2002 should yield the result of 4. Since only two digits, i.e. the 98 and the 02 are stored in computer memory, however, subtracting 98 from 02 will yield the incorrect result of −96. As for in sorting and comparison operations, 1998 will incorrectly be computed to be after or greater than 2002 since 98 is greater than 02.

In another example, a person with a birthday of Nov. 10, 1965 will be considered to be −65 years old rather than 35 years old on Nov. 10th, 2000 if the years 1965 and 2000 are represented by 65 and 00, respectively. Most application programs do not expect a sign value and will therefore ignore the negative sign. Thus, in this example, the negative 65 might be interpreted as the absolute value 65. Not only is this value still incorrect, it is even less detectable than the incorrect value of negative 65. Further, if such incorrect data is stored in a database, it is considered a data integrity exposure.

If nothing is done to solve the year 2000 problem, the stock exchanges will yield invalid transactions, credit card companies will refuse most transactions because card holders will appear to be delinquent on their payments, mortgage companies will automatically issue delinquency notices in error charging borrowers with extra interest, and utility companies will likely cut off service to many customers due to apparent late billing payments.

Moreover, the year 2000 problem is a problem today. Forecasting applications that deal with future dates will encounter problems well in advance of the year 2000. For example, financial applications that deal with life insurance or bond policies that have expiration dates that go beyond the year 2000 must be fixed now to prevent incorrect policy expiration calculations.

The year 2000 is not a hardware clock problem that can be resolved by computer vendors. The problem stems mostly from application programs and data using two digits for year representations even though the hardware clock and or system timer service can provide a four digit format. The problem occurs on main frame systems and/or legacy applications but also affects any type of computerized file, database, or log entry with two digit year fields.

Some effort has been made to address the year 2000 problem. For example, IBM has issued the third edition of the guide book "The Year 2000 and Two-Digit Dates: A Guide For Planning and Interpretation and Implementation" (May, 1996). This guide book, over 200 pages long, teaches information system managers and system and application programmers how to add two more digits to every two year date field in all a firm's databases and application programs. See also "Beating The Clock: How to Assess Your Year 2000 Conversion Effort"; Kearney, Information Week, Apr. 15, 1996, pages 66–71.

The main problem with this approach is the time involved. At a great expense, computer programmers must search for each date field in each program and in each database and manually add two digits to what appears to be a date field whether it needs to be changed or not. The revised programs and databases must then be tested. It is probably already too late to actually complete this arduous task for large databases and large programs before the year 2000 using prior art methodologies.

Another problem is that when two extra digits are added, additional memory is required. Still another problem is that computer programmers do not always characterize dates in a straight forward manner. It may be relatively straight forward to find fields in a database called "date" or "time". Programmers, however, often use other non-meaningful terms, e.g., "X1", "ALPHA", "YB" and the like for dates. If these date fields are not found and corrected, all the errors associated with the year 2000 problem will still occur. And, programmers may use "date" or "year" as variable names (e.g., "year-to-date") which are not actually dates or years. The problem is further compounded in that different high level programming languages, e.g. COBOL, FORTRAN, and BASIC, have quite different formats for arithmetic and sorting operations.

SUMMARY OF INVENTION

It is therefore an object of this invention to provide a more efficient system and method for identifying and correcting computer operations involving two-digit year date fields regardless of the application programming language used or the database program used.

It is a further object of this invention to provide such a system and method which does not require a search for all the date fields in existing computer databases and application programs.

It is a further object of this invention to provide such a system and method which does not require the use of additional computer database memory.

It is a further object of this invention to provide such a system which works correctly regardless of the variable names assigned to the date field.

It is a further object of this invention to provide such a system and method which does not require excessive man hours for implementation and testing.

It is a further object of this invention to provide such a system and method which can be implemented automatically regardless of the computer language used.

It is a further object of this invention to provide such a system and method which accurately and efficiently solves the year 2000 problem.

It is a further object of this invention to provide such a system and method which can be quickly understood and implemented.

It is a further object of this invention to provide such a system and method which does not involve changing a company's existing databases.

It is a further object of this invention to provide such a system and method which has the ability to change and test one application program at a time.

It is a further object of this invention to provide such a system and method which can be easily and quickly tested for accuracy.

This invention results from the realization that the year 2000 problem with respect to certain computer operations involving two digit year formats stored in computer databases and processes can be efficiently solved, not by adding extra digits to every two digit database entry, but by modifying a subset of computer operations (e.g. subtraction, sorting, and comparison) to force a correct result. The invention does not require severe increases in memory because extra digits are never added to the existing two digit year formats and yet the invention renders the correct result when computer operations involving subtraction, sorting and comparison are executed. The invention applies to all computer languages and is easily implemented in an existing application through the use of a unique routine that automatically adds corrective computer instructions to the code of the existing application.

This invention features a system for identifying and correcting computer operations involving two digit year dates. One computer operation to be corrected is the subtraction operation. The system includes a computer; means, operable on the computer, for searching for a subtraction operation involving a plurality of two digit quantities representing year dates; means for executing the subtraction operation to obtain a difference value between the plurality of two digit quantities; means for verifying a negative difference value; and means, responsive to the means for verifying, for adding to the difference value a plurality of two digit numbers whose sum is 100.

The subtraction operation usually includes computer instructions in existing computer code and the means for adding includes means for inserting a first new computer instruction in the existing computer code after the subtraction operation. This first new computer instruction adds a plurality of two digit numbers whose sum is 100 to the difference value. The means for verifying typically also includes means for inserting a second new computer instruction between the existing computer code and the first new computer instruction for executing the first new instruction only if the difference value is negative.

This invention also features a system for correcting computer comparison operations involving two digit year dates. There are means, operable on the computer, for searching for a comparison operation involving a plurality of two digit quantities representing year dates, means for adding a number (e.g, 90) or combination of numbers (e.g., 80+10) large enough to all the plurality of two digit quantities forming modified two digit quantities such that two digit numbers representing a year before the year 2000 is increased to greater than 100 but is truncated to two digits, effectively decreasing the two digit year value by 10 (e.g., 100 minus 90) and two digit numbers representing a year equal to or greater than 2000 is increased to no greater than 100; and means for executing the comparison operation on said modified two digit quantities. Typically, the system further includes means for adding a second number (e.g., 10) or a second combination of numbers (e.g., 5+5) to all the modified two digit quantities after the comparison operation is executed, the sum of the first number (or the first combination of numbers) and the second number (or the second combination of numbers) being 100. The first number or combination of numbers may be between 80 and 90 to correct comparison operations concerning the years spanning a 99 year range. Using 90 provides correction for dates between 1910 and 2009 and using 80 provides correction for dates between 1920–2019.

In a broader sense, the invention features a system for correcting computer operations involving two digit year dates, the system comprising: means, operable on a computer, for searching for a computer programming operation in an application program involving two digit quantities representing year dates; and means for inserting computer instructions in the application program, the computer instructions including an arithmetic routine for changing the value of the two digit quantities to correct the computer programming operation. The prior art, in contrast, involves a change to the databases containing the two digit year quantities.

If the computer operation is a subtraction operation, the means for inserting computer instructions includes: means for verifying a negative difference value when the subtraction operation is executed and means, responsive to the means for verifying, for adding, to the difference value, a plurality of two digit numbers whose sum is 100.

If the computer operation is a comparison operation, the means for inserting computer instructions include means for adding a first number or first combination of numbers less than 100 to all the two digit quantities forming modified two digit quantities before the comparison operation is executed on said modified two digit quantities. The computer instructions further add a second number or second combination of numbers to all the modified two digit quantities after the comparison operation is executed, the first number or first combination of numbers and the second number or second combination of numbers totaling 100. The first number or combination of numbers, when added to the two digit quantities representing a year before the year 2000 is increased to greater than 100 but is truncated to two digits, effectively decreasing the two digit year value by 100 minus the number or combination of numbers and when added to two digit quantities representing a year equal to or greater than 2000, results in a number no greater than 100.

This invention also features a system for correcting computer subtraction operations involving two digit year dates, the system comprising: a computer having computer code including at least one subtraction operation involving a plurality of two digit quantities representing year dates; means for executing the subtraction operation to obtain a difference value between the plurality of two digit quantities; means for verifying a negative difference value; and a computer instruction, inserted within the code, including means for adding, to the difference value, a plurality of two digit numbers whose sum is 100.

For comparison operations, the system comprises: a computer having computer code including at least one comparison operation involving a plurality of two digit quantities representing year dates; and a computer instruction, inserted within the code, including means for decreasing all two digit numbers representing a year before the year 2000 before the comparison operation is executed.

This invention also features a method for correcting computer code including subtraction operations involving two digit year dates, the method comprising: computerized searching for subtraction operations in computer code involving a plurality of a two digit quantities representing year dates; executing the subtraction operation on a computer to obtain a difference value between the plurality of two digit quantities; and adding, to all negative difference values, a plurality of two digit numbers whose sum is 100. For comparison operations, the method comprises: computerized searching for a comparison operation involving a plurality of two digit quantities representing year dates; adding a first number or first combination of numbers to all the two digit quantities forming modified two digit quantities such that the two digit number representing a year before the year 2000 is decreased and increased for years 2000 and beyond; and executing the comparison operation on said modified two digit quantities on a computer. In a preferred embodiment, this method further includes adding a second number or second combination of numbers to all the modified two digit quantities after the comparison operation is executed, the first number or the first combination of numbers and the second number or the second combination of numbers totaling 100. If the first number or first combination of numbers is between 80 and 90, comparison operations concerning years spanning a 99 year range are corrected.

More broadly, the method for correcting computer code includes searching for computer operations involving two digit quantities representing year dates; and inserting computer instructions in the computer code, the computer instructions including an arithmetic routine for changing the value of the two digit quantities to correct the computer operation. If the computer operation is a subtraction operation, the step of inserting computer instructions includes: verifying a negative difference value when the subtraction operation is executed, and adding, to the difference value, a plurality of two digit numbers whose sum is 100. If the computer operation is a comparison operation, the step of inserting computer instructions includes adding a first number less than 100 to all the two digit quantities forming modified two digit quantities before the comparison operation is executed on said modified two digit quantities. The method further includes adding a second number to all modified two digit quantities after the comparison operation is executed, the first number and the second number totaling 100. The first number or first combination of numbers, when added to two digit quantities representing the year before the year 2000, result in a number equal to the year reduced by 100 minus the first number or combination of numbers, and the first number or first combination of numbers, when added to the two digit quantity representing a year equal to or greater than the year 2000, should result in a number equal to the year plus the first number or combination of numbers producing a result less than 100.

This invention also features a method for correcting computer code including at least one subtraction operation involving a plurality of two digit quantities representing year dates, the method comprising: executing the subtraction operation on a computer to obtain a difference value between the plurality of two digit quantities; verifying a negative difference value; and inserting a computer instruction which adds, to the difference value, a plurality of two digit numbers whose sum is 100.

For comparison operations involving a plurality of two digit quantities representing year dates, the method features inserting a computer instruction in the computer code which decreases all two digit numbers representing a year before the year 2000 and increases years 2000 and beyond before the comparison operation is executed. The step of inserting includes adding a first number or first combination of numbers to all the two digit quantities plurality of two digit quantities and adding a second number or second combination of numbers to all the modified two digit quantities after the execution of the comparison operation on said modified two digit quantities, the first number or the first combination of numbers and the second number or second combination of numbers totaling 100.

A method for correcting computer operations involving two digit quantities year dates in accordance with this invention includes inserting a computer instruction which includes an arithmetic routine for changing the value of the two digit quantities to correct the computer operation. If the computer operation is a subtraction operation, and the inserted computer instruction adds, to a difference value between two such two digit quantities, a plurality of two digit numbers whose sum is 100. If the computer operation includes a comparison operation, the computer instruction decreases all two digit numbers representing a year before the year 2000 and increases all two digit numbers representing years equal to or greater than the year 2000 before the comparison operation is executed. One computer instruction adds a first number or a first combination of numbers to all the two digit quantities forming modified two digit quantities before the comparison operation is executed on said modified two digit quantities and another computer instruction adds a second number or a second combination of numbers to all the modified two digit quantities after the execution of the comparison operation, the first number or the first combination of numbers and the second number or the second combination of numbers totaling 100.

DISCLOSURE OF PREFERRED EMBODIMENT

Other objects, features and advantages will occur to those skilled in the art from the following description of a preferred embodiment and the accompanying drawings, in which.

Figure 1:
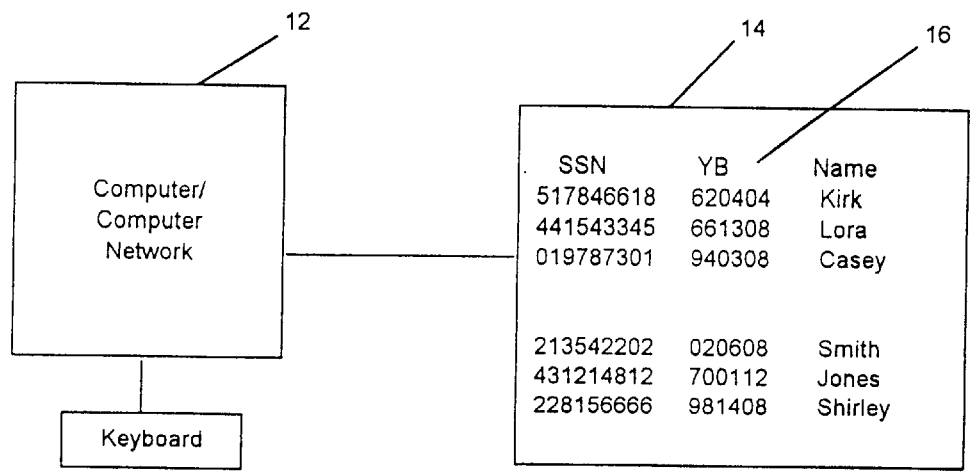
FIG. 1 is a schematic view of the system of this invention for correcting computer operations involving two digit year dates.

System 10, FIG. 1, of this invention includes computer or computer network 12 including one or more databases such as database 14 containing names, (NAME) year of birth (YB) and social security number (SSN). Computer 12 is an IBM or IBM compatible or "Apple" stand alone desk top computer, or IBM or other main frame computer or minicomputer, or even a microprocessor or a network of personal and/or mainframe computers or a client-server network. Operating on computer 12, as is known in the art, are various application programs written in various high level programming languages such as COBOL, FORTRAN, BASIC, and the like. Database 14 is often created using a commercially available database program such as IMS, DB2, dBase, Lotus 1,2,3 or similar software.

As discussed in the Background of the Invention above, after Jan. 1, 2000, computer operations involving subtraction, sorting, or comparison of dates in date field 16 of database 14 will often yield incorrect results. For example, on Jan. 1, 2002 Shirley's age will be calculated thus: 02−98=−96. For programs that do not expect a sign value, the negative sign will be ignored and negative 96 will be interpreted as the absolute value 96. Not only is this value incorrect, it is even less detectable than the incorrect value of negative 96.

Figure 2:
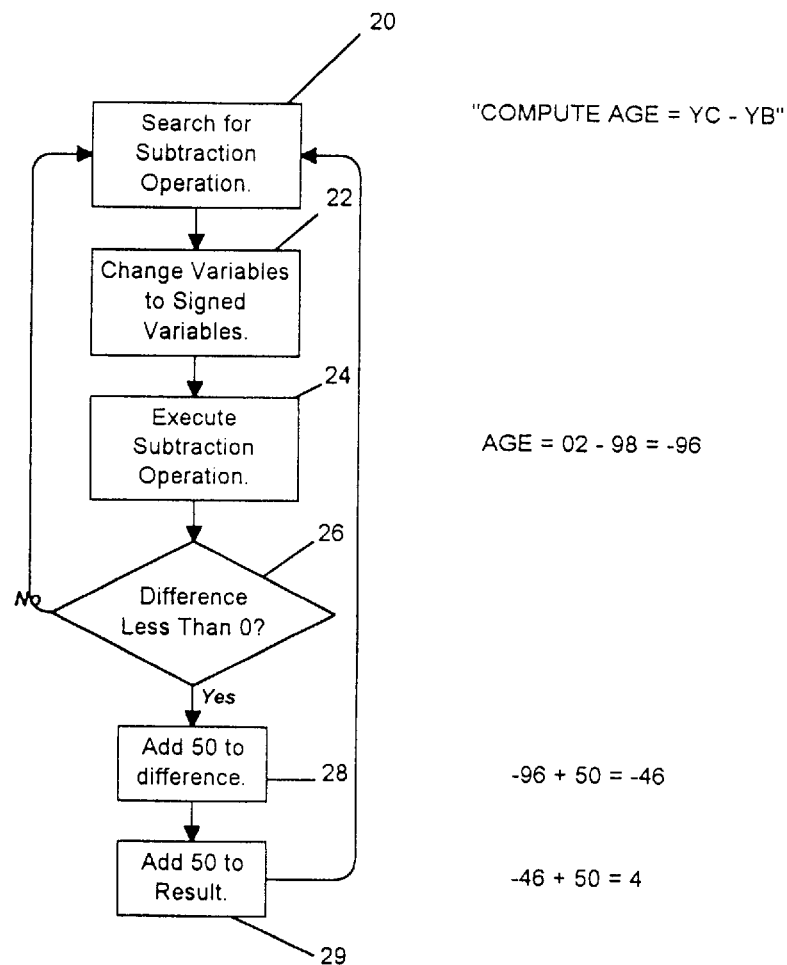
FIG. 2 is a flow chart depicting the method of correcting computer subtraction operations in accordance with this invention.

In accordance with this invention, however, a search is made for all such subtraction operations, step 20, FIG. 2. The variables involved in this subtraction operation are then changed to signed variables, step 22. So, for example, in the COBOL computer language, a subtraction operation in an application program may be: "compute age=yc−yb" where yc is the current year (e.g. 2002) and yb is the year of birth (e.g. 98). The variable "age" is changed to a sign variable and the subtraction operation is then executed, step 24, resulting in age=02−98=−96, since only a two digit year date is stored in database 14, FIG. 1. When the difference is less than 0, step 26, 50 is added to the difference resulting in −46, step 28 and then 50 is again added to this result, step 29 resulting in the correct answer of 4. The number 50 is twice added to the difference because adding 100 to a two digit number cannot be accomplished as easily since only two digits are normally computed and stored for the number 100, namely 00.

Although in this example, 50 is added twice to the difference, any two numbers or any plurality of numbers totaling 100 could be added to the difference with the same effect e.g. 50+10+40; 10+20+25+45; 16+32+11+11+30. Processing then continues as shown to search for the next subtraction operation. This routine can be implemented automatically for all of a company's computer code in a program which will then automatically evaluate each piece of existing code and add the routine depicted in FIG. 2 after each subtraction operation found in the search. Any general purpose editor such as the "Revolve" program available from Microfocus, Inc. of Palo Alto, Calif. may be used to implement such a program.

Note that database 14, FIG. 1 was not changed or affected in any way and extra digits were not added to the year date field 16, FIG. 1. Thus, no additional memory is required and the variable name ("e.g. YB") assigned to the year in question is irrelevant. Accordingly, no search need be made to find all the variable names assigned to year date fields. This is because the method of this invention focuses on the subtraction operation of the application program and not database 14. Properly implemented programs which add the lines of code as described above can be made to operate automatically eliminating the excessive man hours and testing required to add additional digits to database 14. In addition, the logic structure of the application program is not affected.

Figure 3:
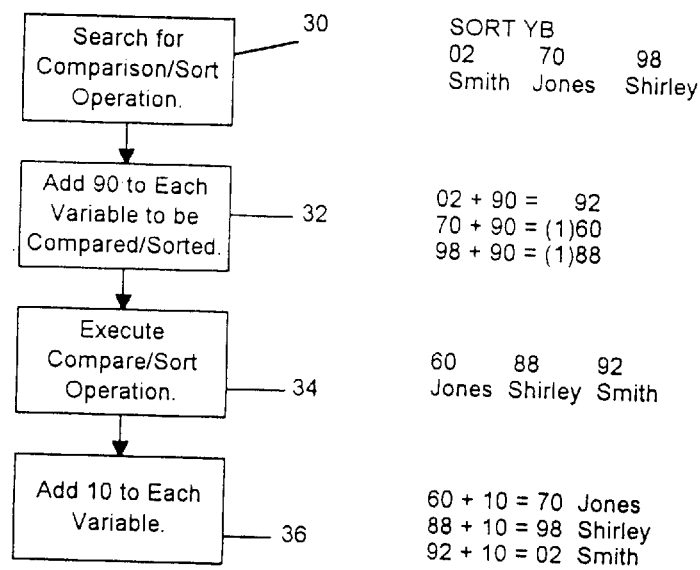
FIG. 3 is a flow chart depicting the method of this invention for correcting computer comparison and sort operations in accordance with this invention.

For comparison and sorting operations, a search is made for the comparison and sort operations in each application program, step 30, FIG. 3. For example, Smith, Jones and Shirley may be sorted by year of birth and database 14 reveals that Smith was born in 2002, Jones was born in 1970, and Shirley was born in 1998. The correct sort is Jones (1970), Shirley (1998), Smith (2002). Since, however, database 14 only stores the year of birth in a two digit format, the application would incorrectly sort Smith first (02), then Jones (70), and then Shirley (98).

However, in this invention, using modulo arithmetic, a number less than 100 (e.g., 90) or plurality of numbers adding to less than 100 (e.g., 80+10) is added to each variable to be sorted or compared, step 32, so that Smith's new two digit year code is 92, Jones' is (1)60 and Shirley's is (1)88. Sorting operations on the two digit representation of these numbers will then correctly sort, Jones (60), Shirley (88), and Smith (92), step 34. After the sort operation is executed, 10 is now added to each variable, step 36, to replace the correct year two digit code in the database. Thus, Jones' two digit year code is returned to 70, Shirley's is returned to 98, and Smith's is returned to 02 to maintain the integrity of the database information.

Although the number 90 is used in this example, any number may be used such that when the number is added to the lowest two digit year date in the field of dates to be sorted below the year 2000, the result is greater than 100 (even though the third digit is not truncated and recognized by the computer), which is equivalent to decreasing all two digit numbers representing years below the year 2000 by a quantity equal to 100 minus the number (or combination of numbers which equal the number (e.g., 90)). In addition, the number, when added to the highest year greater than the year 2000, must produce a result less than 100. In this way, all post-year 2000 dates are not increased to a number greater than 100. So, adding 90 allows waiting until the year 2009 before a given sort routine will need to be modified again. Adding 80 and testing for the current year to be less than 20 allows waiting until the year 2019. For example, if the number added is 90, comparison operations concerning a span of 99 years (e.g., the years 1910–2009) will be corrected.

Although a sort operation is shown in the example described above, sort operations and comparison operations are analogous since a sort operation is merely an implementation of a number of comparison operations. Accordingly, FIG. 3 is a general flow chart depicting the method of this invention for both sort and comparison computer operations. Therefore, "comparison" operations as used herein include sort operations and vice versa.

Figure 4A:
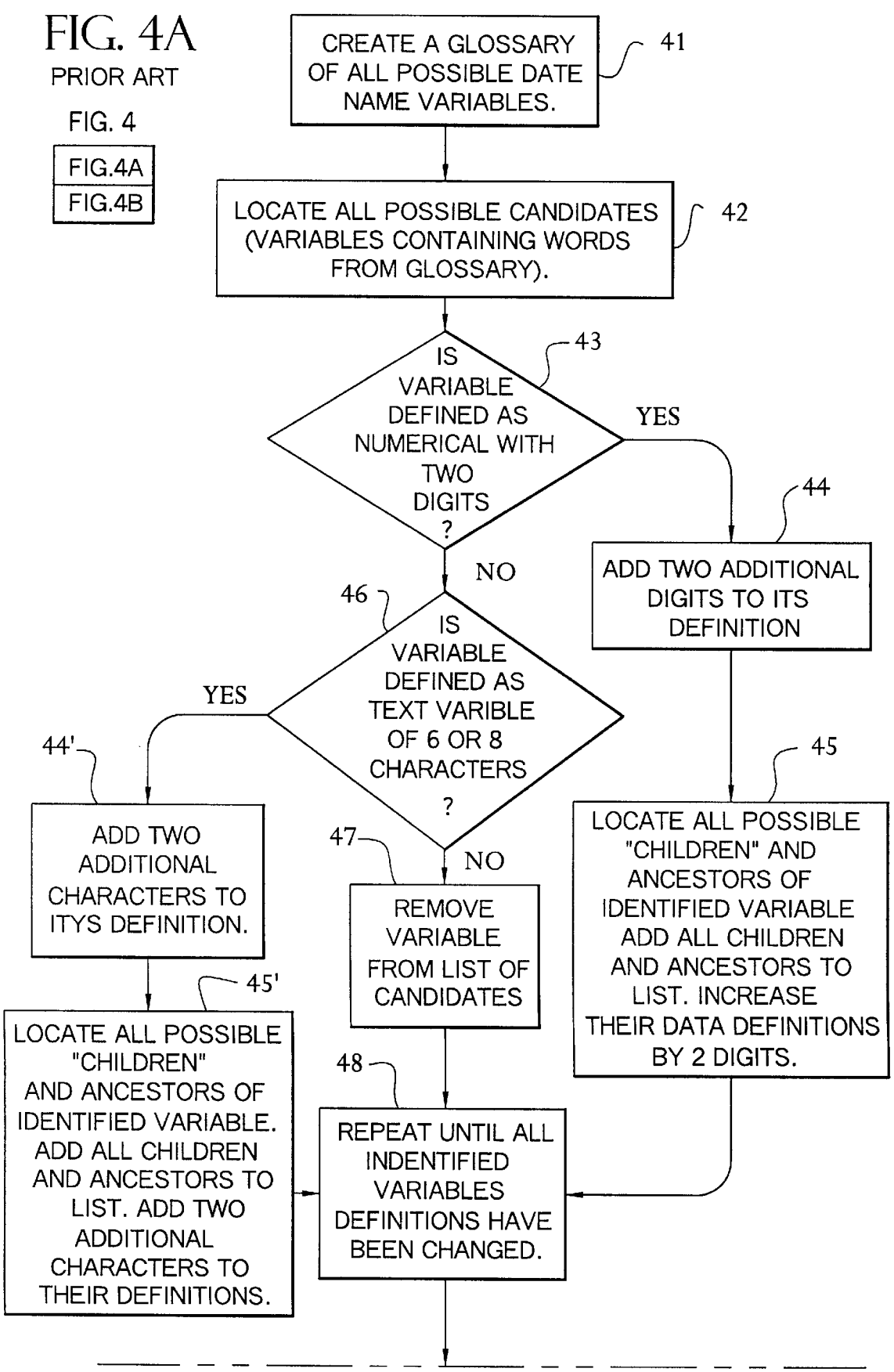
FIGS. 4A and 4B are a flow chart depicting one prior art method of solving the year 2000 problem.
Figure 4B:
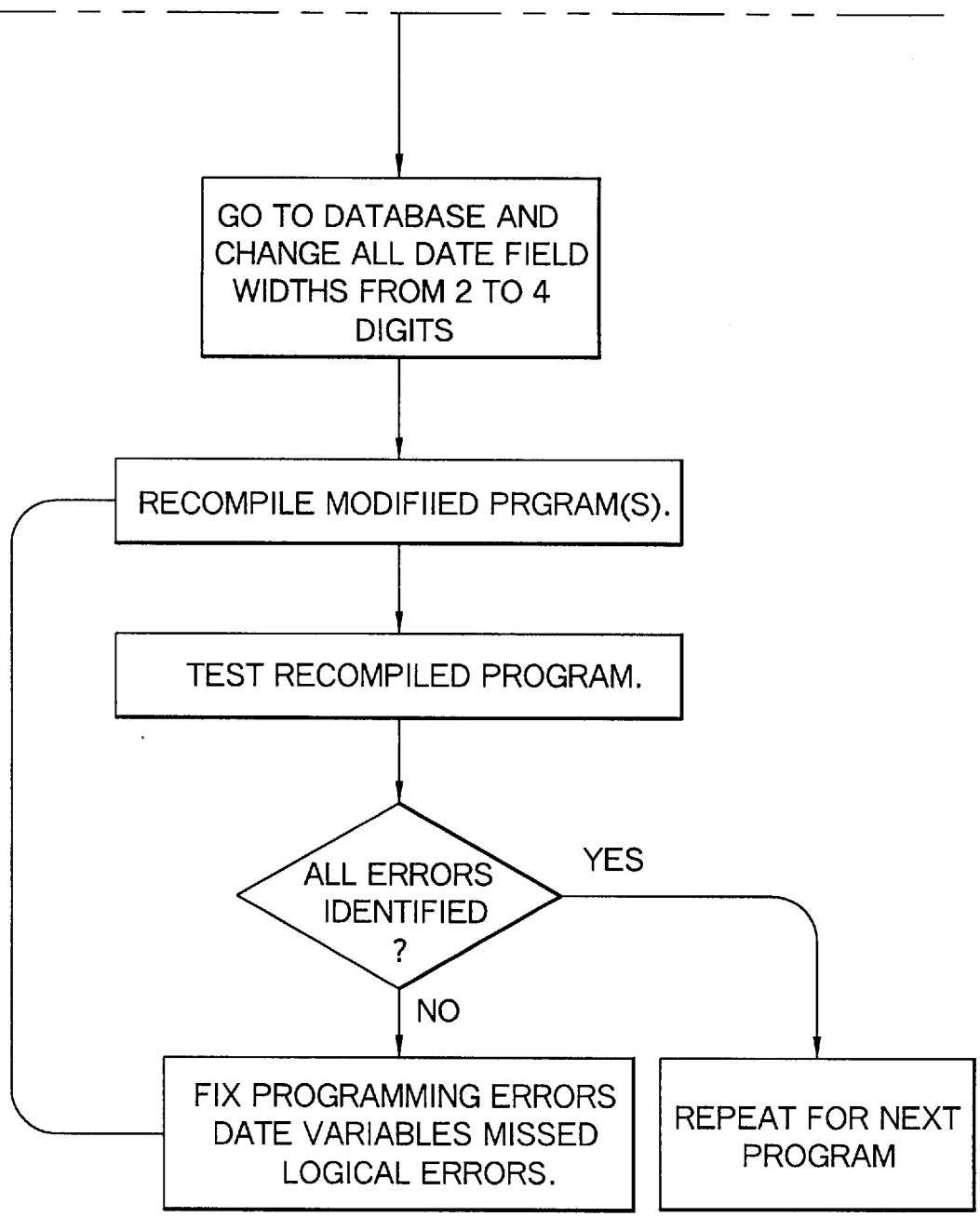

The prior art method is much more complicated, time consuming, expensive, and error prone. First, a glossary of all possible date name variables must be created, step 41, FIG. 4A. As discussed in the Background of the Invention above, this initial step is problematic because programmers do not always use meaningful terms in naming variables for dates. Variables that are not dates could also be misidentified as date variables. The programmers must then locate all possible candidates from the glossary, step 42, and if the variable is defined as a number with two or six digits, step 43, two additional digits are added to the definition, step 44. A six digit date is defined as YY DD MM where the first two digits represent the year, the second two represent the day of the month and the last two represent the month. Even though the variable includes six digits or more, the year field is still only represented by two digits. Note the effect on memory space. Next, all possible "children" and the "ancestors" of the identified variable are located and added to the list to increase the date definition by two additional digits, step 45. Children are defined as copies of the variable and ancestors are defined as variables that were copied to the identified variable. The same two steps, 44' and 45' are executed if a variable is defined as a text variable of six or eight characters, step 46. An eight digit date is defined as YY/DD/MM where the first two digits represent the year, the fourth and fifth digits represent the day, and the seventh and eighth represent the month. Those variables not meeting the above criteria are then removed from the list of candidates, step 47, and this process is repeated, step 48, until all the identified variable definitions have been changed. The remainder of the steps of this prior art methodology are delineated in the IBM "guide book" referenced in the Background of the Invention above.

In contrast, in this invention, database 14, FIG. 1 is not affected and instead additional computer instructions are automatically inserted near each subtraction, sort and comparison operation in the existing programs as described above.

The following COBOL program shows typical compute, subtract, compare/sort computer operations in an application program before correction by the system of this invention:

DATA DEFINITION SECTION

List of variables identified by searching for SUBTRACT, COMPUTE, AND COMPARE commands.

| 01 PATRON-RECORD | |
|---|---|
| 05 PR-NAME | PIC X(18) |
| 05 FILLER | PIC X(42) |
| 05 PR-TARGET-CONTR | PIC 9(4)V99 |
| 05 PR-ACTUAL-CONTR | PIC 9(4)v99 |
| 05 PR-CONTR-DATE | |
| 10 PR-CONTR-YR | PIC 99 |
| 10 PR-CONTR-DAY | PIC 99 |
| 10 PR-CONTR-MNTH | PIC 99 |
| 05 PR-CONTR-AGE | PIC 99 |
| 01 PRIOR-YR | PIC 99 |
| 01 PRIOR-PERIOD | PIC 99 |
| 01 PRIOR-CYCLE | PIC 99 |
| 01 FISCAL-YEAR | PIC 99 |
| 01 FISCAL-PERIOD | PIC 99 |
| 01 FISCAL-CYCLE | PIC 99 |
| 01 CORRECT-YEAR | PIC 99 |

PROGRAM SECTION

Subtract search identified variables

SUBTRACT PR-CONTR-YR FROM CURRENT-YR GIVING PR-CONTR-AGE.

Less than or greater than comparisons identified variables:

```
IF PR-CONTR-YR>FISCAL-YR
   GO TO 100-YR-SUMMARY
IF PR-CONTR-YR<FISCAL-YR
   MOVE FISCAL-YR TO CURRENT-YR.
```

The means for searching for subtraction, compute and comparison/sort operations involving a plurality of two digit quantities representing year dates, and the means for correcting these computer operations are shown in the following COBOL program which is the program shown above after it is changed in accordance with the method of this invention:

DATA DEFINITION SECTION

List of variables identified by searching for SUBTRACT, COMPUTE, AND COMPARE/SORT commands. All identified variables are changed to signed variables (i.e., the letter S before the number of digits (characters) occupied by the variable.

| 01 PATRON-RBCORD | |
|---|---|
| 05 PR-NAME | PIC X(18) |
| 05 FILLER | PIC X(42) |
| 05 PR-TARGET-CONTR | PIC 9(4)V99 |
| 05 PR-ACTUAL-CONTR | PIC 9(4)V99 |
| 05 PR-CONTR-DATE | |
| 10 PR-CONTR-YR | PIC S99 |
| 10 PR-CONTR-DAY | PIC S99 |
| 10 PR-CONTR-MNTH | PIC S99 |
| 05 PR-CONTR-AGE | PIC S99 |
| 01 PRIOR-YR | PIC S99 |
| 01 PRIOR-PERIOD | PIC S99 |
| 01 PRIOR-CYCLE | PIC S99 |
| 01 FISCAL-YEAR | PIC S99 |
| 01 FISCAL-PERIOD | PIC S99 |
| 01 FISCAL-CYCLE | PIC S99 |
| 01 CURRENT-YEAR | PIC S99 |

PROGRAM SECTION

```
SUBTRACT PR-CONTR-YR FROM CURRENT-YR GIVING
PR-CONTR-AGE.
   IF PR-CONTR-AGE<0
      ADD 50 50 TO PR-CONTR-AGE.
ADD 90 TO PR-CONTR-YR FISCAL-YR.
IF PR-CONTR-YR>FISCAL-YR
   THEN
      ADD 10 TO PR-CONTR-YR FISCAL-YR
      GO TO 100-YR-SUMMARY.
   ELSE
      ADD 10 TO PR-CONTR-YR FISCAL-YR.
   ENDIF.
ADD 90 TO PR-CONTR-YR FISCAL-YR
IF PR-CONTR-YR<FISCAL-YR
   THEN
      ADD 10 TO PR-CONTR-YR FISCAL-YR
      MOVE FISCAL-YR TO CURRENT-YR.
   ELSE
      ADD 10 TO PR-CONTR-YR FISCAL-YR.
   ENDIF.
```

Figures 5, 5A, 5B:
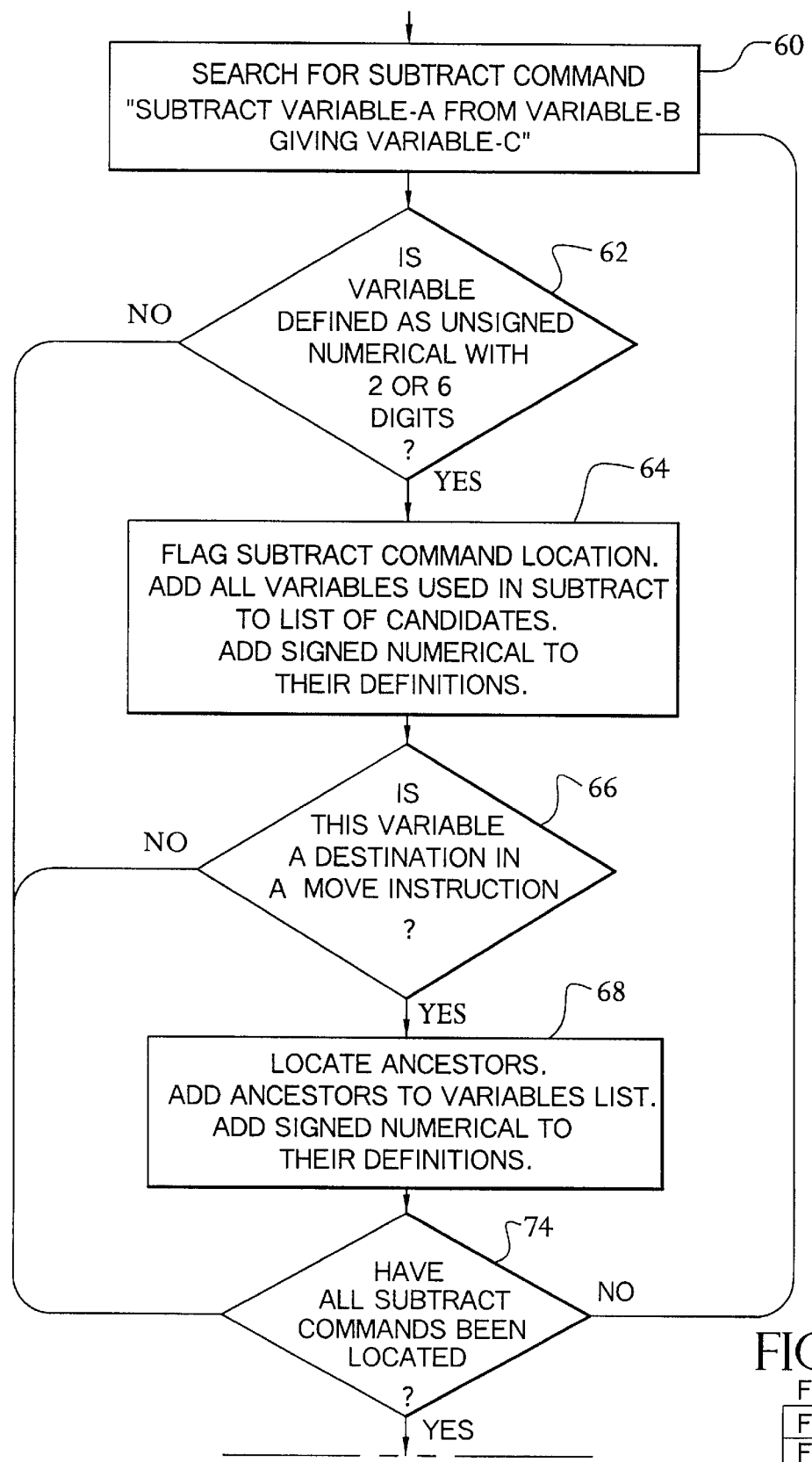
FIGS. 5A and 5B are a more detailed flow chart depicting the method of correcting computer subtraction operations in the COBOL computer language in accordance with this invention.
Figure 5B:
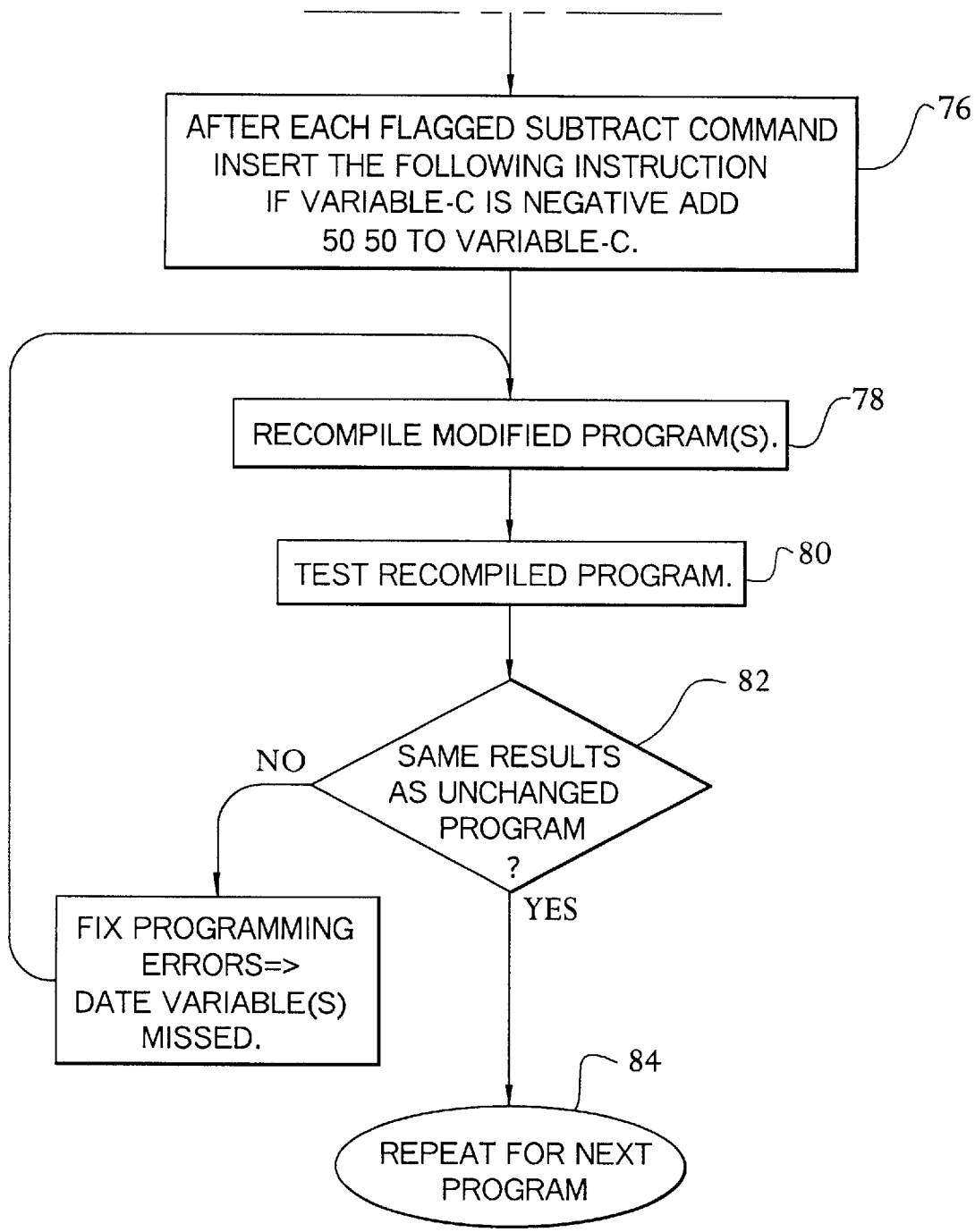

Accordingly, in the above example for the COBOL computer language, a search is made for all subtract commands, step 60, FIG. 5A, in order to correct subtraction operations. If the variable is defined as an unsigned number with two or six digits, step 62, the subtract command location is flagged, and all variables used are added to a list of candidates, and signed numbers are added to their definitions, step 64. If the variable is a destination in a "move" instruction, step 66, all ancestors are located and they are added to the variable list and changed to signed variables, step 66. Once all such subtract commands have been located, step 74, and if the year is a two digit number, the computer instruction "IF VARIABLE-C IS NEGATIVE ADD 50 50 TO VARIABLE-C" is added after each flagged subtract command, step 76. If the date is a six digit number (YYDDMM) the computer instruction is "IF VARIABLE-C IS NEGATIVE, ADD 500000 500000 TO VARIABLE-C". The application program is then recompiled, step 78, tested, step 80, and checked to make sure that the results are the same as the unchanged version, step 82. This process is then repeated for each of the firm's computer programs, step 84.

Figures 6, 6A, 6B:
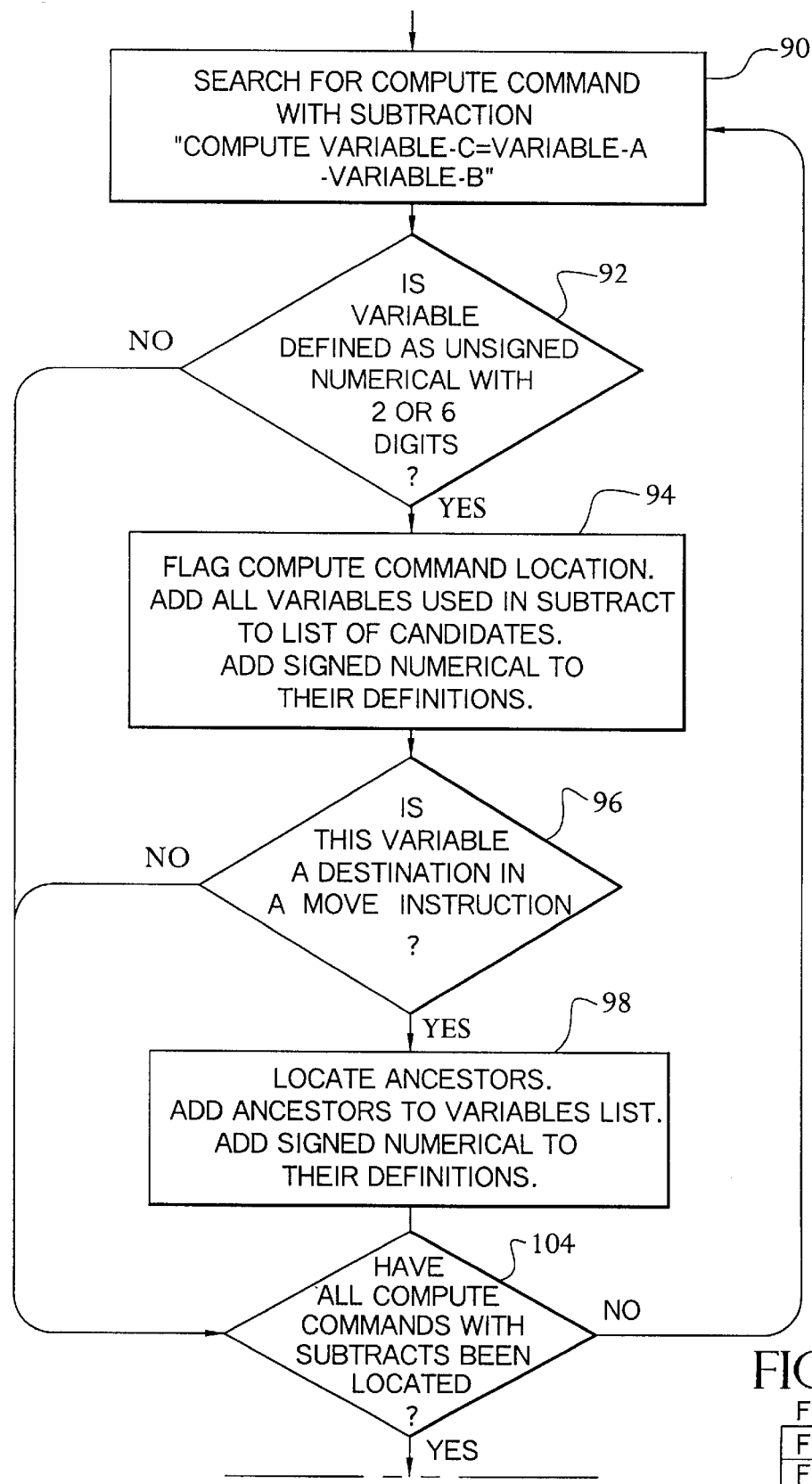
FIGS. 6A and 6B are a more detailed flow chart depicting the method of this invention for correcting COBOL compute operations.
Figure 6B:
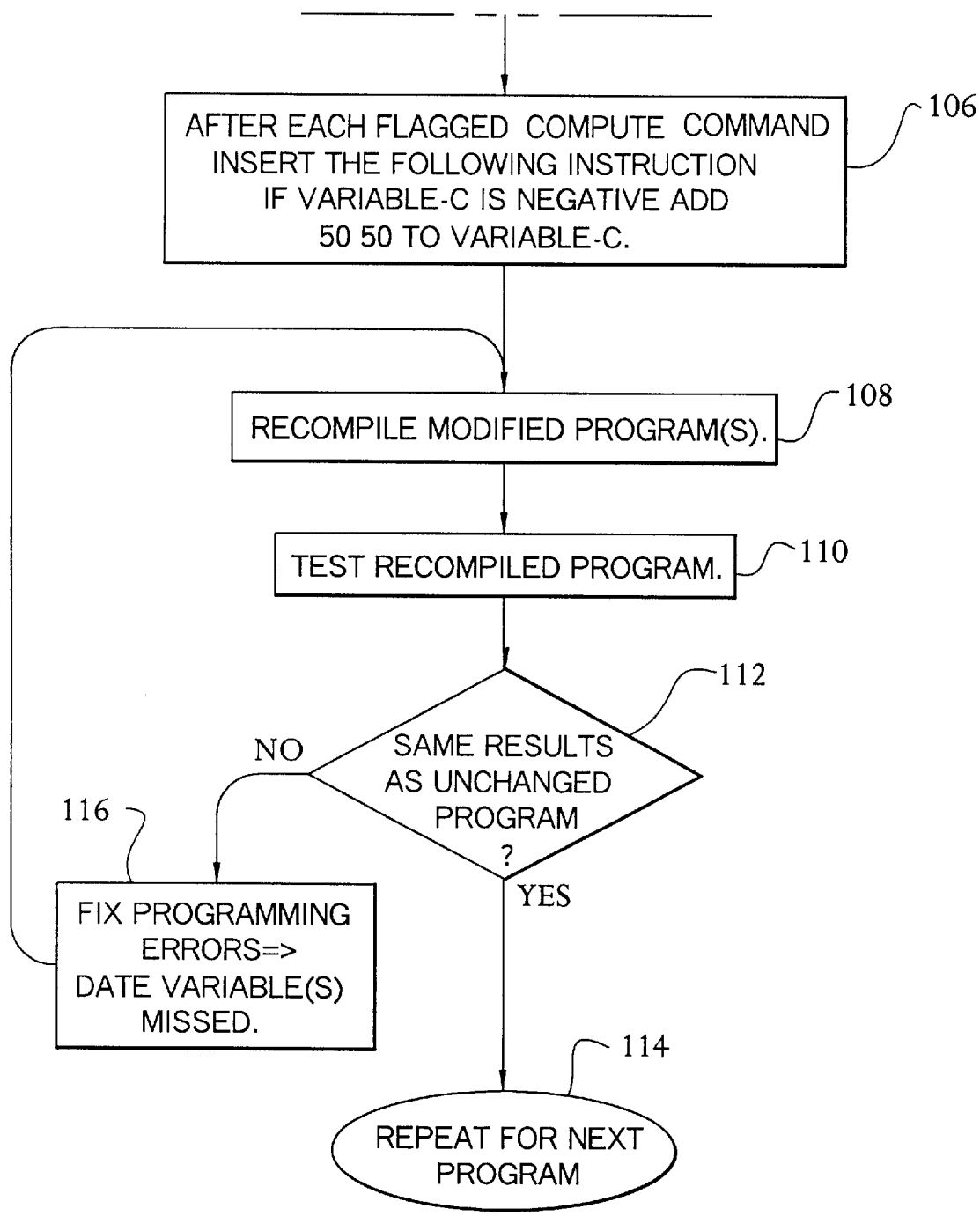

For compute operations, a search is made for each compute command with a subtract operation, step 90, FIG. 6A. If the variable is defined as a number with two or six digits, step 92, each compute command with a subtract operation location is flagged and all variables in these commands are added to the list of candidates and changed to sign variables, step 94. If a particular variable is a destination in a "move" instruction, step 96, all ancestors are located as described above, step 98, and added to the list and changed to signed variables. Once all such compute commands with subtract operations have been located, step 104, the instruction "IF VARIABLE-C IS NEGATIVE ADD 50 50 TO VARIABLE-C", is inserted, step 106 and the source code is recompiled, step 108. If the date is a six digit number (YYDDMM) the computer instruction is: "IF VARIABLE-C IS NEGATIVE, ADD 500000 500000 TO VARIABLE-C". The recompiled program is then tested, step 110 and if the result is the same as the unchanged program, step 112, the process is repeated for each application program, step 114. If the results are not the same in step 112, the programming errors are fixed and all date variables are rechecked, step 116.

Figure 7A:
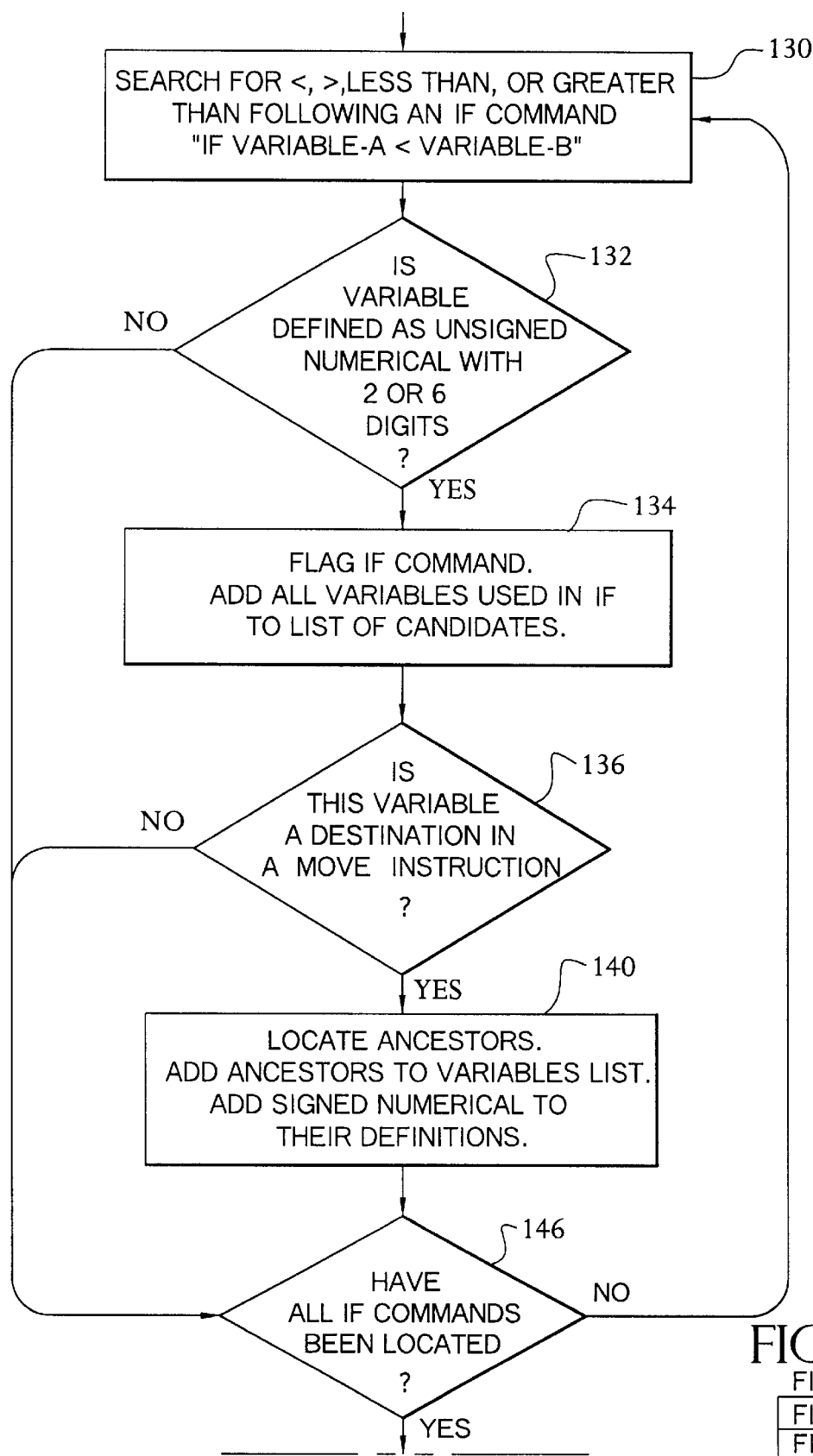
FIGS. 7A and 7B are a more detailed flow chart depicting the method of this invention for correcting COBOL compare operations.
Figure 7B:
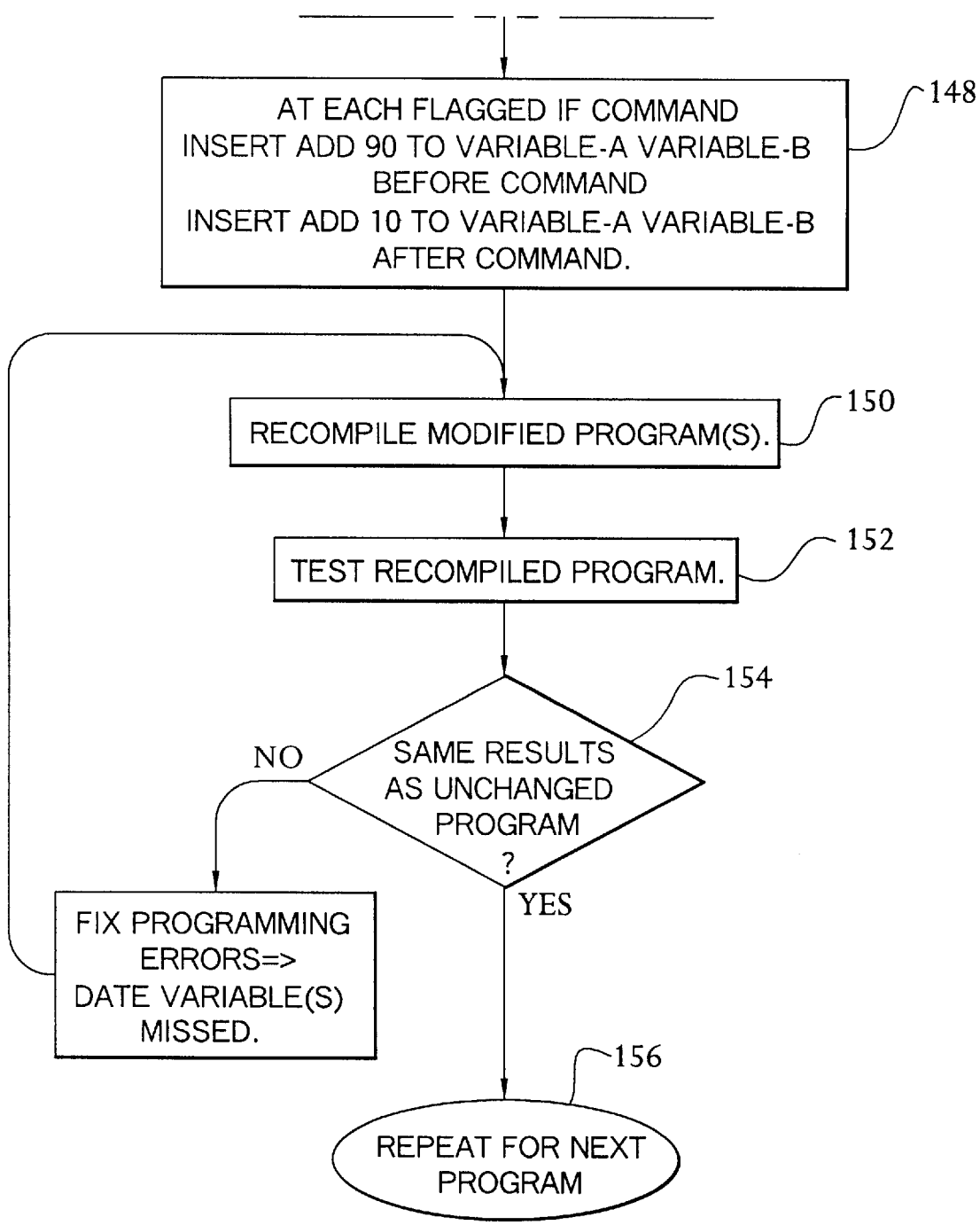

For compare computer operations in the COBOL language, a search is made for all less than or greater than commands following an IF command in the source code, step 130, FIG. 7A. If any of the data definitions are unsigned numeric two or six digits, step 132, the IF command is flagged and all variables used in the IF command are added to the list of candidates, step 134. If the variable is a destination in a "move" instruction, step 136, all ancestors are located, added to the variable list, and converted to signed variables, step 140. Once all such IF commands have been located, step 146, the command "ADD 90 TO VARIABLE-A VARIABLE-B" is added before the IF command and the instruction "ADD 10 TO VARIABLE-A VARIABLE-B" is inserted after the IF command, step 148. If the variable has six digits, the computer instruction: "ADD 900000 TO VARIABLE-A VARIABLE-B" is inserted before the "IF" command and the instruction "ADD 100000" TO VARIABLE-A VARIABLE-B" is inserted after the "IF" command. The program is then recompiled, step 150 tested, step 152, and checked to make sure the results are the same as the unchanged program, step 154. This process is then repeated for the next application program, step 156.

The result is modified computer code with added computer instructions which vary slightly depending on whether the original computer code included subtraction, compute, sort and/or comparison operations. This process is much simpler and can be automated in routines to correct all of a company's computer code without the need to change the logical structure of the computer code, reprogram the application programs, or, worse, to search for each two digit year variable in the databases and add one or two more digits to the two digit year fields in the databases.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. A system for identifying and correcting computer subtraction operations involving two digit year dates, the system comprising:

a computer;

means, operable on said computer, for searching for a subtraction operation involving a plurality of two digit quantities representing year dates;

means, operable on said computer, for executing the subtraction operation to obtain a difference value between said plurality of two digit quantities;

means, operable on said computer, for verifying a negative difference value between said plurality of two digit quantities; and means, operable on said computer and responsive to said means for verifying, for adding to said difference value a plurality of two digit numbers whose sum is 100.

2. The system of claim 1 in which said subtraction operation includes computer instructions in existing computer code and said means for adding includes means for inserting a first new computer instruction in said existing computer code after said subtraction operation, said first new computer instruction including the addition of said plurality of two digit numbers whose sum is 100 to said difference value.

3. The system of claim 2 in which said subtraction operation includes computer instructions in existing computer code and said means for verifying includes means for inserting a second new computer instruction between said existing computer code and said first new computer instruction for executing said first new instruction only if said difference is negative.

4. A system for correcting computer comparisons involving two digit year dates, the system comprising:

a computer;

means, operable on said computer, for searching for a comparison operation involving a plurality of two digit quantities representing year dates;

means, operable on said computer, for adding a first number or first combination of numbers large enough to all said plurality of two digit quantities such that two digit numbers representing years before the year 2000 are decreased by a quantity equal to 100 minus the number or combination of numbers, forming modified two digit quantities; and means, operable on said computer, for executing said comparison operation on said modified two digit quantities.

5. The system of claim 4 further including means, operable on said computer, for adding a second number or second combination of numbers to all said modified two digit quantities after said comparison operation is executed, the sum of the first number or first combination of numbers and the second number or second combination of numbers being 100.

6. The system of claim 4 in which said first number or first combination of numbers, when added to the highest year over the year 2000, results in the year being increased by an amount equal to the first number or first combination of numbers producing a sum less than 100.

7. The system of claim 4 in which said first number or first combination of numbers is between 80 and 90 to correct comparison operations concerning the years spanning a 99 year range.

8. A system for correcting computer operations involving two digit year dates, the system comprising:

means, operable on a computer, for searching for a computer programming operation in an application program involving two digit quantities representing year dates;

means, operable on a computer, for inserting computer instructions in said application program, said computer instructions including an arithmetic routine for changing the value of said two digit quantities; and means, operable on said computer, for executing said computer instructions to correct said computer programming operation.

9. The system of claim 8 in which a said computer operation is a subtraction operation and said means for inserting computer instructions includes:

means for verifying a negative difference value when said subtraction operation is executed, and means responsive to said means for verifying, for adding, to said difference value, a plurality of two digit numbers whose sum is 100.

10. The system of claim 8 in which said computer operation is a comparison operation and said means for inserting computer instructions includes means for adding a first number or first combination of numbers less than 100 to all said two digit quantities forming modified two digit quantities, before the comparison operation is executed on said modified two digit quantities.

11. The system of claim 10 in which said computer instructions further includes adding a second number or second combination of numbers to all said modified two digit quantities after said comparison operation is executed, the first number or first combination of numbers and the second number or second combination of numbers totaling 100.

12. The system of claim 10 in which said first number or first combination of numbers, when added to all the two digit quantities representing a year before the year 2000, results in a number equal to the year reduced by an amount equal to 100 minus said first number or first combination of numbers.

13. The system of claim 10 in which said first number or first combination of numbers, when added to the largest two digit quantity representing a year greater than the year 2000, results in a number equal to the sum of the year plus said first number or first combination of numbers less than 100.

14. A system for correcting computer subtraction operations involving two digit year dates, the system comprising:

a computer having computer code including at least one subtraction operation involving a plurality of two digit quantities representing year dates;

means, operable on said computer, for executing the subtraction operation to obtain a difference value between said plurality of two digit quantities;

means, operable on said computer, for verifying a negative difference value; and a computer instruction, inserted within said computer code, including means for adding, to said difference value, a plurality of two digit numbers whose sum is 100.

15. A system for correcting computer operations involving two digit year dates, the system comprising:

a computer having computer code including at least one comparison operation involving a plurality of two digit quantities representing year dates; and a computer instruction, inserted within said code, including means for decreasing all two digit numbers representing a year before the year 2000 and for increasing all two digit numbers representing a year greater than the year 2000 before the comparison operation is executed.

16. The system of claim 15 in which said means for increasing and said means for decreasing are implemented by means for adding a first number or a first combination of numbers to all said two digit numbers representing a year before the year 2000 and all said two digit numbers representing a year greater than the year 2000 forming modified two digit numbers, before the comparison operation is executed on said modified two digit quantities.

17. The system of claim 16 in which said means for increasing and said means for decreasing further includes means for adding a second number or a second combination of numbers to all said modified two digit numbers after the execution of said comparison operation, said first number or the first combination of numbers and the second number or the second combination of numbers totaling 100.

18. A system for correcting computer operations involving two digit year dates, the system comprising:

a computer having at least one computer operation involving two digit quantities representing year dates; and an inserted computer instruction including an arithmetic routine for changing the value of said two digit quantities;

wherein said computer executes said computer instruction to correct said computer operation.

19. The system of claim 18 in which said computer operation includes at least one subtraction operation and said computer instruction adds, to the difference value of the subtraction operation, a plurality of two digit numbers whose sum is 100.

20. The system of claim 18 in which said computer operation includes a comparison operation and said computer instruction decreases all two digit numbers representing years before the year 2000 and increases all two digit numbers representing years after the year 2000 before the comparison operation is executed.

21. The system of claim 20 in which said computer instruction adds a first number or a first combination of numbers to all said two digit numbers representing a year before the year 2000 and all said two digit numbers representing a year greater than the year 2000 forming modified two digit numbers, before the comparison operation is executed on said modified two digit numbers.

22. The system of claim 21 in which said computer instruction further adds a second number or a second combination of numbers to all said modified two digit numbers after the execution of said comparison operation, said first number or first combination of numbers and said second number or second combination of numbers totaling 100.

23. A method for correcting computer code including subtraction operations involving two digit year dates, the method comprising:

computerized searching for subtraction operations in computer code involving a plurality of a two digit quantities representing year dates;

executing the subtraction operation on a computer to obtain a difference value between said two quantities; and adding, to all negative difference values, a plurality of two digit numbers whose sum is 100.

24. A method for correcting computer code including comparison operations involving two digit year dates, the method comprising:

computerized searching for a comparison operation involving a plurality of two digit quantities representing year dates;

adding a first number or first combination of numbers to all said plurality of two digit quantities such that the smallest two digit number representing a year before the year 2000 is decreased by a quantity equal to 100 minus the first number or the first combination of numbers, forming modified two digit quantities;

executing, on a computer, said comparison operation on said modified two digit quantities.

25. The method of claim 24 further including adding a second number or a second combination of numbers to all said modified two digit quantities after the comparison operation is executed, the first number or the first combination of numbers and the second number or the second combination of numbers totaling 100.

26. The method of claim 24 in which the first number or first combination of numbers, when added to years equal to over the year 2000, increases the year by the first number or combination of numbers resulting in a sum less than 100.

27. The method of claim 24 in which the first number or first combination of numbers is between 80 and 90 to correct comparison operations concerning years spanning a 99 year range.

28. A method for correcting computer code including computer operations involving two digit year dates, the method comprising:

searching for computer operations involving two digit quantities representing year dates;

inserting computer instructions in said computer code, said computer instructions including an arithmetic routine for changing the value of said two digit quantities; and executing said computer instructions to correct said computer operations.

29. The method of claim 28 in which said computer operation is a subtraction operation and the step of inserting computer instructions includes:

verifying a negative difference value when said subtraction operation is executed, and adding, to said difference value, a plurality of two digit numbers whose sum is 100.

30. The method of claim 28 in which said computer operation is a comparison operation and the step of inserting computer instructions includes adding a first number or a first combination of numbers less than 100 to all the two digit quantities forming modified two digit quantities, before the comparison is executed on said modified two digit quantities.

31. The method of claim 30 in which the step of inserting computer instructions further includes adding a second number or a second combination of numbers to all modified two digit quantities after the comparison operation is executed, the first number or combination of numbers and the second number or the second combination of numbers totaling 100.

32. The method of claim 30 in which the first number or the first combination of numbers, when added to the two digit quantity representing the year before the year 2000, results in a number equal to the year reduced by 100 minus the first number or the first combination of numbers.

33. The method of claim 30 in which the first number or first combination of numbers, when added to the two digit quantity representing a year equal to or greater than the year 2000, results in a number equal to the year plus the first number or the first combination of numbers producing a sum less than 100.

34. A method for correcting computer code including at least one subtraction operation involving a plurality of two digit quantities representing year dates, the method comprising:

executing the subtraction operation on a computer to obtain a difference value between the two quantities;

verifying a negative difference value; and inserting a computer instruction which adds, to the difference value, a plurality of two digit numbers whose sum is 100.

35. A method for correcting computer code including at least one comparison operation involving a plurality of two digit quantities representing year dates, the method comprising:

inserting a computer instruction in said computer code which decreases all two digit numbers representing a year before the year 2000 before the comparison operation is executed.

36. The method of claim 35 in which the step of inserting includes adding a first number or a first combination of numbers to all said two digit quantities forming modified two digit quantities, before the comparison is executed on said modified two digit quantities.

37. The method of claim 36 further including adding a second number or a second combination of numbers to all said modified two digit quantities after the execution of the comparison operation, the first number or the first combination of numbers and the second number or the second combination of numbers totaling 100.

38. A method for correcting computer operations involving two digit quantities representing year dates, the method comprising:

inserting computer instructions including an arithmetic routine for changing the value of said two digit quantities; and executing said computer instructions to correct said computer operations.

39. The method of claim 38 in which a computer operation includes at least one subtraction operation and an inserted computer instruction adds, to a difference value between two such two digit quantities, a plurality of two digit numbers whose sum is 100.

40. The method of claim 38 in which a computer operation includes a comparison operation and an inserted computer instruction decreases all two digit numbers representing a year before the year 2000 before the comparison operation is executed.

41. The method of claim 40 in which said inserted computer instruction adds a first number or a first combination of numbers to all said two digit quantities forming modified two digit quantities, before the comparison operation is executed on said modified two digit quantities.

42. The method of claim 41 in which said inserted computer instruction further adds a second number or a second combination of numbers to all said modified two digit quantities after the execution of the comparison operation, the first number or the first combination of numbers and the second number or the second combination of numbers totaling 100.

* * * * *